(12) United States Patent
Villa et al.

(10) Patent No.: US 8,173,513 B2
(45) Date of Patent: *May 8, 2012

(54) METHOD FOR MANUFACTURING A SEMICONDUCTOR PRESSURE SENSOR

(75) Inventors: Flavio Francesco Villa, Milan (IT); Gabriele Barlocchi, Cornaredo (IT); Pietro Corona, Milan (IT); Benedetto Vigna, Pietrapertosa (IT); Lorenzo Baldo, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 799 days.

This patent is subject to a terminal disclaimer.

(21) Appl. No.: 12/163,110

(22) Filed: Jun. 27, 2008

(65) Prior Publication Data

US 2008/0261345 A1    Oct. 23, 2008

Related U.S. Application Data

(62) Division of application No. 11/082,491, filed on Mar. 16, 2005, now abandoned.

(30) Foreign Application Priority Data

Mar. 19, 2004    (EP) .................................... 04425197

(51) Int. Cl.
*H01L 21/76* (2006.01)

(52) U.S. Cl. ............ 438/422; 438/50; 438/53; 438/429; 257/E21.573; 257/E21.564

(58) Field of Classification Search .................. 438/421, 438/422, 429; 257/522, E21.573, E21.564
See application file for complete search history.

(56) References Cited

U.S. PATENT DOCUMENTS

| | | | |
|---|---|---|---|
| 4,744,863 A | 5/1988 | Guckel et al. | |
| 4,766,666 A | 8/1988 | Sugiyama et al. | |
| 4,945,769 A | 8/1990 | Sidner et al. | |
| 4,993,143 A | 2/1991 | Sidner et al. | |
| 5,242,863 A | 9/1993 | Xiang-Zheng et al. | |
| 5,291,788 A | 3/1994 | Oohata et al. ................... | 73/727 |
| 5,510,276 A | 4/1996 | Diem et al. | |
| 6,131,466 A | 10/2000 | Vigna et al. | |

(Continued)

FOREIGN PATENT DOCUMENTS

DE    42 27 893 A1    4/1993

(Continued)

OTHER PUBLICATIONS

Sato, T., et al., "A New Substrate Engineering for the Formation of Empty Space in Silicon (ESS) Induced by Silicon Surface Migration," in Proceedings of the International Electron Devices Meeting, Technical Digest, 1999, pp. 517-520.

(Continued)

*Primary Examiner* — Kenneth Parker
*Assistant Examiner* — Jose R Diaz
(74) *Attorney, Agent, or Firm* — Seed IP Law Group PLLC

(57) ABSTRACT

Method for manufacturing a semiconductor pressure sensor, wherein, in a silicon substrate, trenches are dug and delimit walls; a closing layer is epitaxially grown, that closes the trenches at the top and forms a suspended membrane; a heat treatment is performed so as to cause migration of the silicon of the walls and to form a closed cavity underneath the suspended membrane; and structures are formed for transducing the deflection of the suspended membrane into electrical signals.

20 Claims, 9 Drawing Sheets

U.S. PATENT DOCUMENTS

| | | | |
|---|---|---|---|
| 6,240,785 B1 | 6/2001 | Chapman et al. | 73/727 |
| 6,536,288 B2 | 3/2003 | Scholz et al. | |
| 6,912,759 B2 | 7/2005 | Izadnegahdar et al. | 29/25.35 |
| 7,045,382 B2 * | 5/2006 | Benzel et al. | 438/50 |
| 7,294,536 B2 | 11/2007 | Villa et al. | |
| 7,763,487 B2 * | 7/2010 | Villa et al. | 438/50 |
| 7,811,848 B2 * | 10/2010 | Barlocchi et al. | 438/52 |
| 2005/0160827 A1 | 7/2005 | Zdeblick et al. | 73/715 |

FOREIGN PATENT DOCUMENTS

| | | |
|---|---|---|
| DE | 101 31 249 A1 | 5/2002 |
| DE | 101 14 036 A1 | 10/2002 |
| EP | 1 324 382 A1 | 7/2003 |
| EP | 1 326 272 A1 | 7/2003 |

OTHER PUBLICATIONS

Sato, T., et al., "Fabrication of Silicon-on-Nothing Structure by Substrate Engineering Using the Empty-Space-in-Silicon Formation Technique," Japanese Journal of Applied Physics 43(1):12-18, Jan. 2004.

Tadigadapa, S., et al., "Applications of High-Performance MEMS Pressure Sensors Based on Dissolved Wafer Process," in Proceedings of the Sensor Expo, Baltimore, MD, May 4-6, 1999, pp. 1-6.

Henning et al., "A MEMS-Based, High-Sensitivity Pressure Sensor for Ultraclean Semiconductor Applications," in Proceedings of the Advanced Semiconductor Manufacturing 2002 IEEE/SEMI Conference and Workshop, Apr. 2002, pp. 165-168.

* cited by examiner

METHOD FOR MANUFACTURING A SEMICONDUCTOR PRESSURE SENSOR

BACKGROUND OF THE INVENTION

1. Field of the Invention

The subject of the present invention is a method for manufacturing a semiconductor pressure sensor.

2. Description of the Related Art

As is known, a pressure sensor is a device that converts a variation in pressure into a variation of an electrical quantity (a resistance or a capacitance). In the case of a semiconductor sensor, the pressure variation is detected by a membrane of semiconductor material, which overlies a cavity and is able to undergo deflection under mechanical stress.

Pressure sensors using semiconductor technology typically find their application in medicine, in household appliances, in consumer electronics (cell-phones, PDAs—Personal Digital Assistants—), and in the automotive field. In particular, in the latter sector, pressure sensors are used traditionally for detecting the pressure of the tyres of motor vehicles, and are used by the control unit for alarm signaling. Pressure sensors are, on the other hand, also used for monitoring air-bag pressure, for controlling the breakdown pressure of the ABS, and for monitoring the pressure of oil in the engine, the pressure of injection of the fuel, etc.

Currently existing sensors manufactured using the semiconductor technology are basically of two types: piezoresistive and capacitive sensors.

Operation of piezoresistive sensors is based upon piezoresistivity, i.e., the capability of some materials to modify their resistivity as the applied pressure varies. Piezoresistors are normally formed on the edge of a suspended membrane (or diaphragm) and are connected to one another in a Wheatstone-bridge configuration. Application of a pressure causes a deflection of the membrane, which in turn generates a variation in the offset voltage of the bridge. By detecting the voltage variation with an appropriate electronic circuit, it is possible to derive the desired pressure information. An example of a piezoresistive sensor of the above type is described in U.S. Pat. No. 6,131,466.

Sensors of a capacitive type are based upon the change in capacitance that occurs when a pressure is applied on a flexible membrane suspended above a support and separated therefrom by a region that is empty or filled with gas (air gap). Two examples of silicon sensors of a capacitive type are described in "A MEMS-Based, High-Sensitivity Pressure Sensor for Ultraclean Semiconductor Applications", A. K. Henning, N. Mourlas, S. Metz published on: http://www.redwoodmicro.com/Papers/ASMC.pdf and "Application of High-Performance MEMS Pressure Sensors Based on Dissolved Wafer Process" A. Tadigadapa, S. Massoud-Ansari, published on: http://www.mems-issys.com/pdf/issystech2.pdf.

In the case where the dielectric present between the two electrodes is a vacuum, an absolute pressure sensor is obtained, whereas, if gas is present, which is generally introduced hermetically at a known reference pressure, the detected capacitance variation is linked to the difference between the external pressure and the internal pressure, and, consequently, a relative pressure sensor is obtained.

Application of a pressure causes a deflection of the membrane with consequent reduction in its distance from the bottom electrode. In this way, the capacitance of the pressure sensor increases. By measuring the difference between the capacitance thus obtained and the rest capacitance (i.e., in the absence of stress), the pressure variation detected by the sensor is obtained.

Also in this case, a circuit for processing the electrical signals generated by the capacitive sensor provides the information of pressure sought.

In general, capacitive technology presents a lower current consumption than does piezoresistive technology. Consequently, capacitive sensors are preferable in those applications where power consumption is an important parameter, for example, in the automotive field, wherein accurate control of the load power is required. Moreover, capacitive pressure sensors present smaller overall dimensions and lower costs, as is required in numerous applications.

Both piezoresistive sensors and capacitive sensors hence call for the construction of a cavity underneath the flexible membrane.

Currently, various solutions have been proposed:

1. use of silicon-on-insulator (SOI) substrates; for instance, pressure sensors using this solution are described in U.S. Pat. Nos. 5,369,544; 5,510,276 and 6,131,466;

2. use of porous silicon (see, for example, U.S. Pat. No. 5,242,863);

3. wet etching from the front (see, for example, U.S. Pat. No. 4,766,666);

4. wet etching from the rear, using tetramethyl ammonium hydroxide (TMAH);

5. other methods (see, for example, U.S. Pat. No. 4,744,863).

In all known solutions, the use of semiconductor technology for making cavities underneath suspended structures and layers calls for processes that are complex, costly and, in some cases, far from compatible with the manufacturing steps currently used in the semiconductor industry for manufacturing integrated circuits.

BRIEF SUMMARY OF THE INVENTION

One embodiment of the present invention is hence to provide a manufacturing method which will overcome the disadvantages of known solutions. The method comprises: providing a wafer comprising a bulk region of semiconductor material; forming a membrane above and at a distance from said bulk region; forming a closed cavity between said membrane and said bulk region; and forming structures for transducing the deflection of said membrane into electrical signals, wherein, the step of forming a membrane includes: digging a plurality of first trenches in said bulk region, said first trenches delimiting a plurality of first walls of semiconductor material; epitaxially growing, starting from said first walls, a closing layer of semiconductor material, said closing layer closing said trenches at the top and forming said membrane; and carrying out a heat treatment, thereby causing migration of the semiconductor material of said first walls and forming a closed cavity.

Another embodiment of the present invention provides a pressure sensor comprises: a bulk region of semiconductor material; a buried cavity overlying a first part of the bulk region; and a membrane suspended above said buried cavity, wherein, said bulk region and said membrane are formed in a monocrystalline substrate, and in that said monocrystalline substrate carries structures for transducing the deflection of said membrane into electrical signals.

BRIEF DESCRIPTION OF THE SEVERAL VIEWS OF THE DRAWINGS

For an understanding of the present invention, preferred embodiments thereof are now described purely by way of non-limiting example, with reference to the attached drawings, wherein.

DETAILED DESCRIPTION OF THE INVENTION

Hereinafter, an embodiment of a process for manufacturing a semiconductor material sensor of capacitive type is described. The present process is based upon the process disclosed in U.S. application Ser. No. 10/327,702 for manufacturing a SOI wafer, and, more precisely, refers to the second embodiment shown in FIGS. 11-14 of said document.

Figure 1:
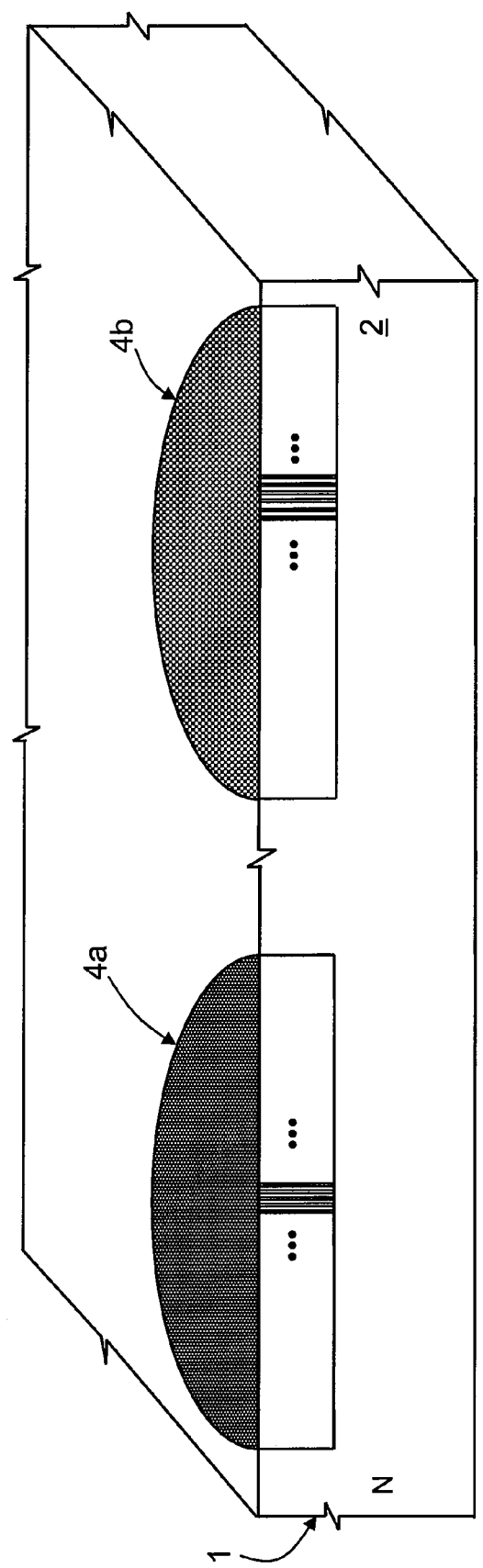
FIG. 1 is a cross-section through a wafer of semiconductor material in an initial manufacturing step.
Figure 3:
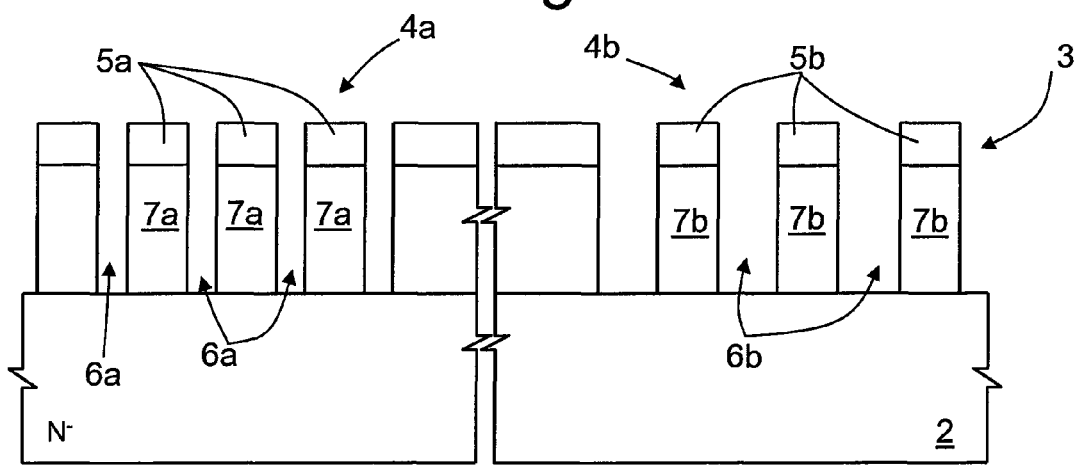
FIG. 3 is a cross-section of details of FIG. 2, at an enlarged scale.

FIG. 1 shows a wafer 1 of semiconductor material, preferably monocrystalline silicon, comprising an N-type substrate 2, designed to form the bulk of the device. A resist mask 3 (visible in the enlarged detail of FIG. 3) is formed on the top surface of the substrate 2. The mask 3 has two circular areas, designated by 4a and 4b and hereinafter referred to as sensor area and reference area, respectively. In each of these areas, a honeycomb lattice is defined, the two lattices being of different sizes.

Figure 2:
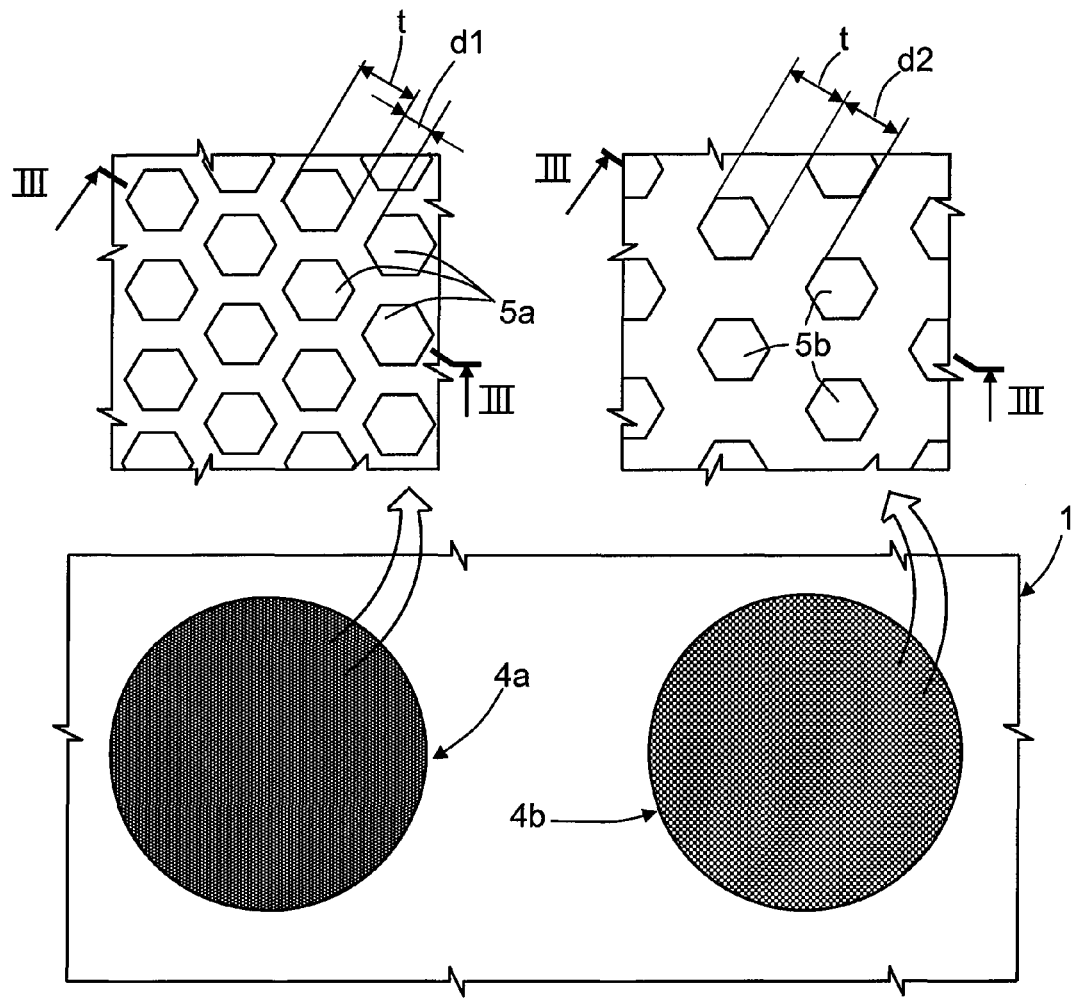
FIG. 2 is a top view of the wafer of FIG. 1.

In particular, as appears in the enlarged detail of FIG. 2, the sensor area 4a has mask regions 5a with an hexagonal shape arranged close to one another (see also the cross-section of FIG. 3), while the reference area 4b has mask regions 5a that are more widely spaced. For example, the distance t between opposite sides of the mask regions 5a and 5b may be 2 µm, the distance d1 between sides facing adjacent mask regions 5a may be 1 µm, and the distance d2 between sides facing adjacent mask regions 5b may be 2 µm.

Using the mask 3, trench etching of silicon of the substrate 2 is performed, so forming a sensor trench 6a and a reference trench 6b at the sensor area 4a and at the reference area 4b, respectively. The channels of the sensor and reference trenches 6a, 6b may have, for example, a depth of approximately 10 µm, are of different width, as may be seen in FIG. 3, and delimit silicon columns 7a and 7b, respectively, which are identical and have a shape at the cross section corresponding to that of the mask regions 5a and 5b.

Figure 4:
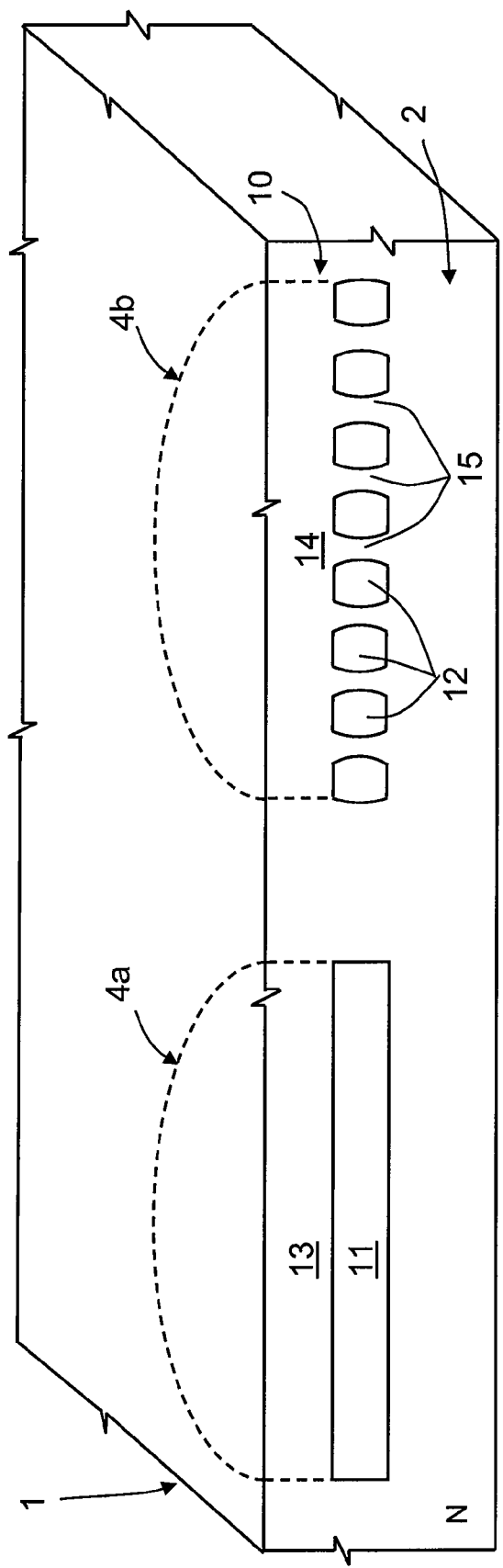
FIGS. 4-9 are cross-sections through the wafer of semiconductor material of FIG. 1, in subsequent manufacturing steps, for a pressure sensor of capacitive type.

Next (see FIG. 4), the mask 3 is removed and an epitaxial growth is performed in a deoxidizing environment (typically, in an atmosphere with a high concentration of hydrogen, preferably using trichlorosilane $SiHCl_3$). Consequently, an epitaxial layer 10 (shown only in FIG. 4 and hereinafter not distinguished from the substrate 2) of N type, grows on top of the silicon columns 7a and 7b and closes, at the top, the sensor and reference trenches 6a, 6b, trapping the gas present therein (here, molecules of hydrogen $H_2$). The thickness of the epitaxial layer 10 may be, for example, 9 µm.

An annealing step is then carried out, for example for 30 minutes at 1190° C.

As discussed in the aforementioned U.S. application Ser. No. 10/327,702, annealing causes a migration of the silicon atoms, which tend to arrange themselves in lower-energy position. Consequently, at the sensor trench 6a, where the columns 7a are arranged close together, the silicon atoms migrate completely and form a sensor cavity 11, closed at the top by a membrane 13. On account of the presence of the sensor cavity 11 (having, for example, a diameter of 600 or 200 µm, according to the pressure to be applied), the membrane 13 is flexible and can be deflected under external stresses.

On the other hand, at the reference trench 6b, where the columns 7b are arranged at a bigger distance from one another, the migration of silicon atoms causes only a thinning of the columns 7b, hereinafter indicated as pillars 15. In practice, a labyrinthine cavity 12 is formed, wider than the reference trench 6b. Furthermore, the pillars 15 in the labyrinthine cavity 12 prevent any movement to the overlying region, hereinafter referred to as electrode region 14.

Preferably, annealing is performed in an $H_2$ atmosphere so as to prevent the hydrogen in the sensor and reference trenches 6a, 6b from escaping through the epitaxial layer 10 to the outside and so as to increase the concentration of hydrogen in the cavities 11 and 12, should the hydrogen trapped inside during the epitaxial growth be not sufficient. Alternatively, annealing can be carried out in a nitrogen environment.

The crystallographic quality of the membrane 13 is excellent, as is evident from tests carried out by the present applicant.

Figure 5:
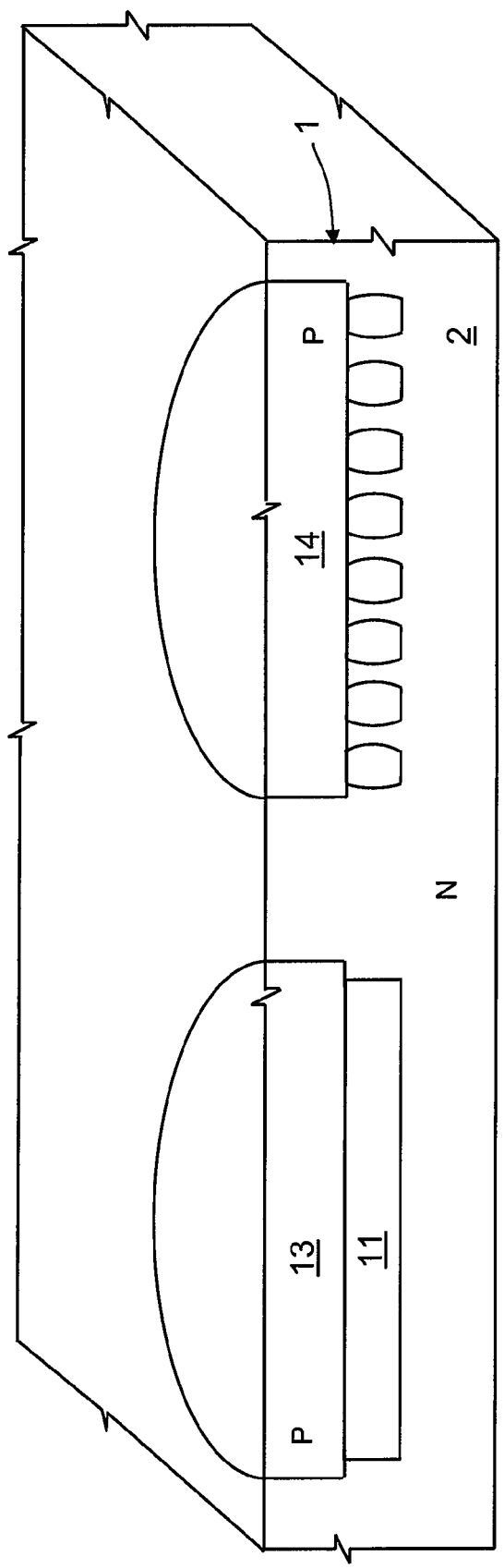
Figure 6:
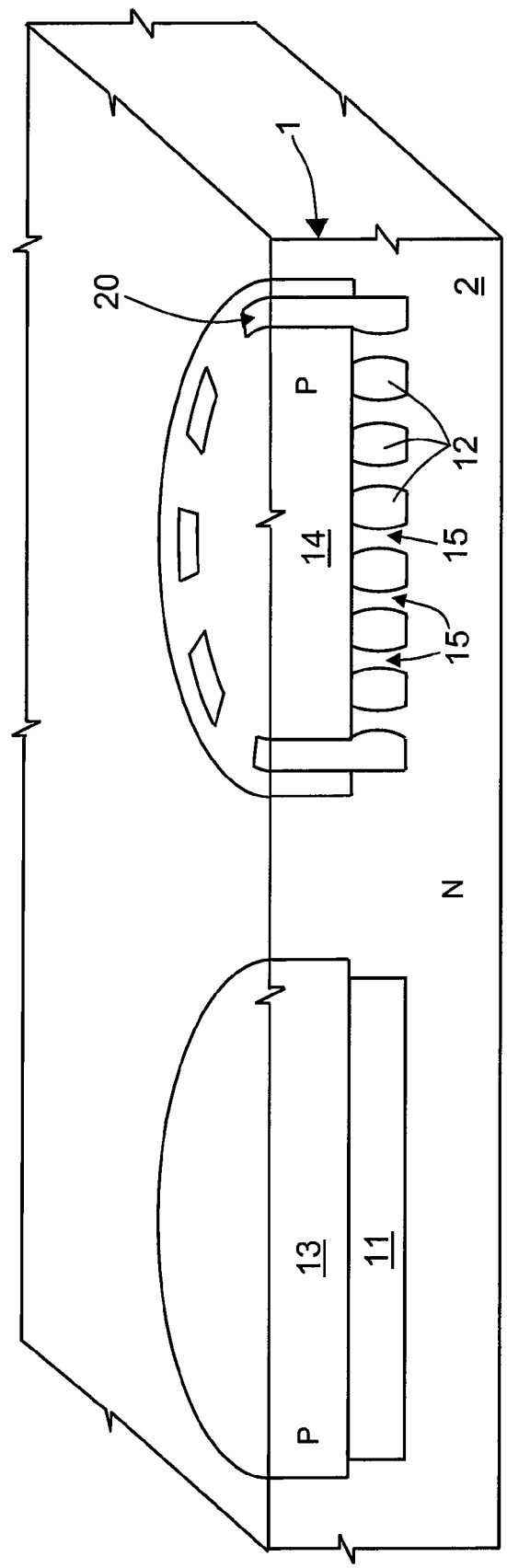

Next (see FIG. 5), the membrane 13 and the electrode region 14 are doped via implantation of P-type dopant species, for example boron. Subsequently (see FIG. 6), an access trench 20 is dug just in the electrode region 14, from the surface of the wafer 1 to reach as far as the labyrinthine cavity 12. The access trench 20 preferably has the shape shown in FIG. 6, and hence extends, by stretches, near the periphery of the area occupied by the labyrinthine cavity 12.

Figure 7:
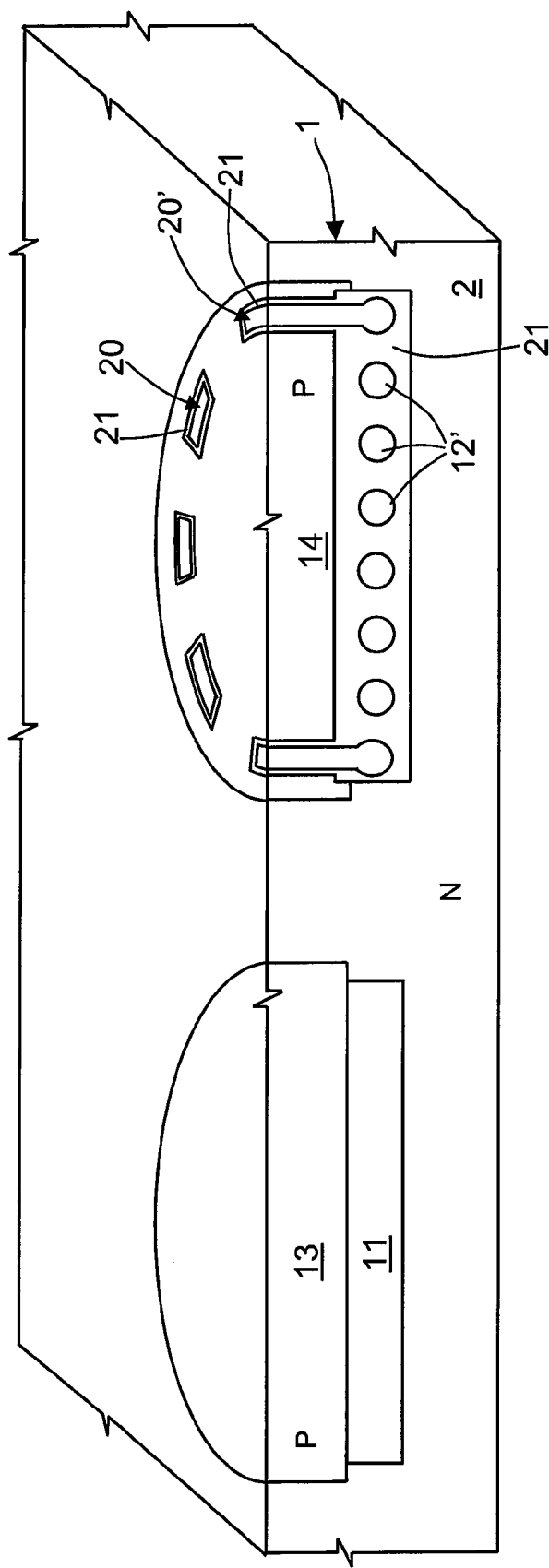

Thermal oxidation of the columns 7b is then carried out so as to form an oxidized region 21 underneath the electrode region 14. The necessary oxygen is fed to the labyrinthine cavity 12 through the access trench 20. In this step, there is a gradual growth of the oxidized region 21 at the expense of the columns 7b and of the silicon of the substrate 2 surrounding the access trench 20 and the labyrinthine cavity 12. In particular, the columns 7b are completely oxidized and increase in volume. As shown in FIG. 7, the labyrinthine cavity 12 and the access trench 20 are filled in part with thermal oxide, but remain partially open (remaining portions 12' and 20' of the labyrinthine cavity and of the access trench).

Figure 8:
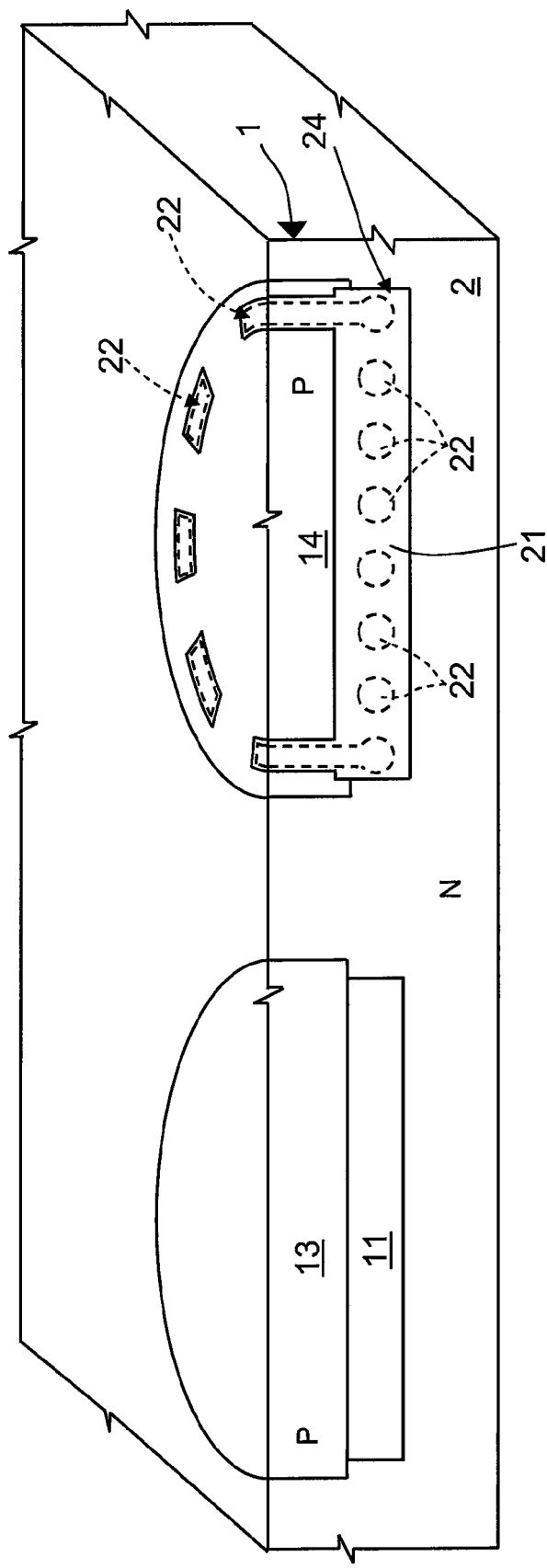

Next (see FIG. 8), the remaining portions 12' and 20' of the labyrinthine cavity and of the access trench are filled with insulating material 22, for example TEOS, forming, as a whole, an insulating region 24. In FIG. 8, for clarity, the demarcation line between the insulating material 22 and the oxidized region 21 is represented by a dashed line. As an alternative, the labyrinthine cavity 12' can remain empty of insulating material, thus avoiding the filling step.

Figure 9:
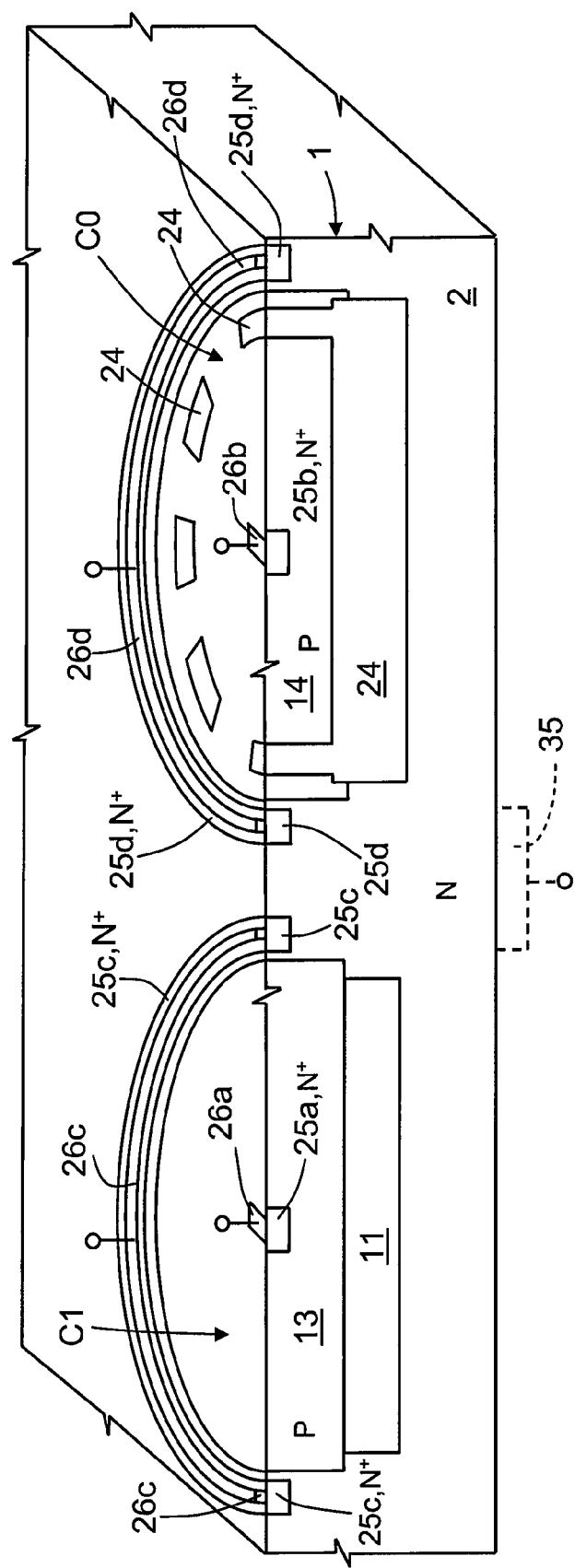

A P-type implantation, an N-type implantation and respective diffusion steps are then carried out in order to form contact regions 25a, 25b of $P^+$-type above the membrane 13 and the electrode region 14 as well as contact regions 25c, 25d of $N^+$-type above the substrate 2 (see FIG. 9). The contact regions 25c, 25d preferably have an annular shape and extend, respectively, around the membrane 13 and around the electrode region 14. Next, metal contacts 26a, 26b, 26c and 26d are formed and contact the contact regions 25a to 25d, respectively.

In practice, the structure of FIG. 9 forms two capacitors, designated by C1 and C0, which have, as first electrode, the membrane 13 and the electrode region 14, respectively; as second electrode, the bulk region underlying the membrane 13 and the bulk region underlying the electrode region 14, respectively; and as dielectric, the sensor cavity 11 and the insulating region 24 (or the oxidized region 21 and the labyrinthine cavity 12'), respectively.

The capacitor C1 (referred to also as sensing capacitor) represents the element sensitive to the pressure that is applied on the membrane 13, while the capacitor C0 (reference capacitor) represents the reference element, which provides the rest capacitance. Since the areas of the P/N junctions of the sensing capacitor C1 and of the reference capacitor C0 are equal, these capacitors have the same junction capacitance and the same leakage currents. In addition, the reference capacitor C0 undergoes a trimming step at the wafer level, using one or more known capacitors arranged in parallel and using a one-time programmable (OTP) device.

If so desired, prior to forming the contact regions 25a-25d, it is possible to integrate the electronic components making up the control circuitry on the same chip of the pressure sensor.

Finally, in a way not shown, the wafer 1 is cut into dice, each containing a sensing capacitor C1 and a reference capacitor C0 (as well as, if envisaged, the control circuitry), and the dice are encapsulated in such a way that the membrane 13 is accessible from the outside.

Operation of the pressure sensor is described hereinafter.

If a pressure is applied on the membrane 13, the latter is deflected, reducing its distance from the bottom electrode (substrate 2). Consequently, the capacitance of the sensing capacitor C1 increases. If the difference between the signal supplied by the sensing capacitor C1 and the signal supplied by the reference capacitor C0 is measured via an electronic circuit for signal processing of the "fully differential" type, there is rejection of the common-mode components and amplification of the differential ones, and hence an indication of the pressure applied is obtained.

The advantages afforded by the described pressure sensor emerge clearly from the foregoing description. In particular, thanks to the described manufacturing process, the silicon pressure sensor is of low cost and reduced dimensions, and hence can be used in numerous applications where these requirements are important.

If so desired, it is possible to integrate on the same chip the sensing capacitor C1 and the reference capacitor C0 and the relative control circuitry, thus reducing the manufacturing and assembly costs, as well as the overall dimensions of the device.

Finally, it is clear that numerous modifications and variations may be made to the pressure sensor described and illustrated herein, all falling within the scope of the invention, as defined in the annexed claims.

In particular, the described technique can be used, with just a few modifications, for producing a pressure sensor of a piezoresistive type. In this case, in fact, it is sufficient, during the final manufacturing steps, for example, simultaneously with the manufacture of the components of the control circuitry, to form piezoresistive elements near the periphery of the membrane 13. Preferably, the piezoresistive elements are of P-type, and the membrane is of N-type. In case of a pressure sensor of piezoresistive type, however, it is not necessary to provide a reference element, and hence all the steps necessary to form the labyrinthine cavity 12 and the insulating region 24, as well as boron implantation, are omitted. An embodiment of a pressure sensor of piezoresistive type is shown in FIG. 10, wherein the elements in common with the embodiment of FIG. 9 are designated by the same reference numbers.

Figure 10:
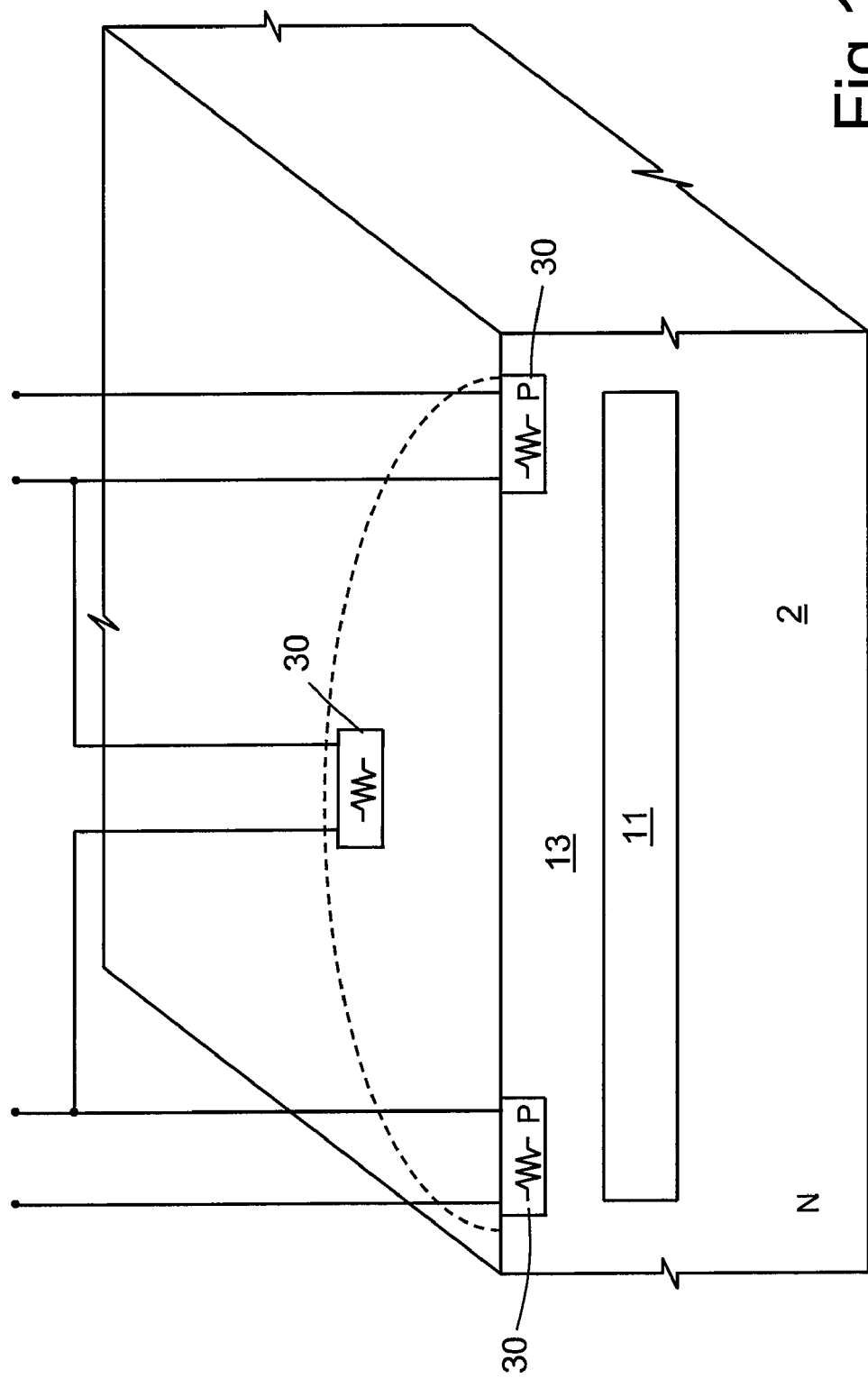
FIG. 10 is a cross-sectional view through a wafer of semiconductor material for a pressure sensor of piezoresistive type.

As is known, in FIG. 10 no insulating region 24 is present, and resistors 30, implanted or diffused, here of a P-type, are formed on the periphery of the membrane 13 (of an $N^-$-type). In FIG. 10, only three resistors 30 can be seen, but it must be understood that a fourth resistor is formed in the non-visible part of the wafer 1 and is connected to the visible resistors 30 in a bridge configuration. In FIG. 10, the interconnections between the resistors 30 (typically metal regions extending above an insulating layer, not shown) are represented schematically.

As an alternative, the resistors 30 may be made of polysilicon above the membrane 13.

For a capacitive sensor, the membrane may be of any shape, for example square or generically polygonal, even though the preferred shape is circular, since it prevents any stress concentration.

The contact of the capacitors C0 and C1 with the second electrode can be made, instead of on the front of the device, on the rear, as indicated by the dashed line 35 in FIG. 9; in this case, it is expedient to use a substrate 2 of $N^+$-type in order to reduce the access series resistance. Also in this case, the epitaxial layer is of $N^-$-type.

The shape of the columns 7a, 7b may vary with respect to what is illustrated. For example, they can be replaced by diaphragms of semiconductor material with reduced thickness, or, in general, by other thin structures (referred to also as walls) capable of enabling migration of silicon during the annealing step and forming the sensor cavity 11 and the labyrinthine cavity 12 (for a capacitive implementation).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for manufacturing a semiconductor pressure sensor, comprising the steps of:
   providing a wafer comprising a bulk region of semiconductor material;
   forming a membrane above and at a distance from said bulk region;
   forming a closed cavity between said membrane and said bulk region; and
   forming structures for transducing the deflection of said membrane into electrical signals;
   wherein, said step of forming a membrane comprises the steps of:
      etching a plurality of first trenches in said bulk region, said first trenches delimiting a plurality of first walls of semiconductor material;
      epitaxially growing, starting from said first walls, a closing layer of semiconductor material, said closing layer closing said trenches at the top and forming said membrane; and carrying out a heat treatment, thereby causing migration of the semiconductor material of said first walls and forming a closed cavity.

2. The method according to claim 1 wherein said first walls comprise columns with polygonal cross sections.

3. The method according to claim 1 wherein said step of carrying out a heat treatment is performed in a deoxidizing environment.

4. The method according to claim 3 wherein said deoxidizing environment comprises hydrogen atoms.

5. The method according to claim 1 wherein said step of forming transducer structures comprises forming contact structures in electrical contact with said membrane and with said bulk region so as to form a pressure sensor of capacitive type.

6. The method according to claim 1, wherein said first walls are arranged at a first distance from one another, the method further comprising the steps of:
   etching second trenches in said bulk region adjacent to said first trenches, said second trenches delimiting second walls of semiconductor material, said second walls being arranged at a second distance from one another greater than said first distance;
   closing said second trenches at the top through a portion of said closing layer;
   modifying the spatial arrangement of said semiconductor material forming said second walls and forming a labyrinthine cavity delimiting pillars of semiconductor material; and
   forming an insulating region in said labyrinthine cavity.

7. The method according to claim 6 wherein said step of etching second trenches is carried out simultaneously to said step of etching first trenches.

8. The method according to claim 6 wherein said step of forming an insulating region comprises the steps of:
   oxidizing said pillars through openings formed in said portion of said closing layer; and
   filling said labyrinthine cavity with insulating material.

9. The method according to claim 6 wherein said step of forming transducer structures comprises:
   forming first contact structures, electrically connected to said membrane;
   forming second contact structures, electrically connected to said portion of said closing layer; and
   forming third contact structures, electrically connected to said bulk region.

10. The method according to claim 1 wherein said step of forming transducer structures comprises forming resistive elements carried by said membrane.

11. The method according to claim 10 wherein said membrane has a first conductivity type, and said step of forming resistive elements comprises introducing ionic dopant species of a second conductivity type within said membrane.

12. The method according to claim 10 wherein said step of forming transducer structures further comprises the step of electrically connecting said resistive elements in a bridge configuration.

13. A method of fabricating a capacitive pressure sensor comprising:
   providing a silicon wafer;
   forming a sensor capacitor in a sensor area of the silicon wafer, wherein said step of forming the sensor capacitor includes:
      forming a plurality of sensor trenches, each sensor trench being separated from an adjacent sensor trench by a first column having a first width;
      epitaxially growing a sensor membrane from the first columns, the sensor membrane fully covering the sensor trenches; and
      annealing the sensor area such that the first columns migrate toward the sensor membrane and the plurality of the sensor trenches merge into a sensor cavity underlying the sensor membrane; and
   forming a reference capacitor in a reference area of the silicon wafer, wherein said step of forming the reference capacitor includes:
      forming a plurality of reference trenches, each reference trench being separated from an adjacent reference trench by a second column having a second width;
      epitaxially growing a reference membrane from the second columns, the reference membrane fully covering the reference trenches; and
      annealing the reference area to partially thin down the second columns; and
      oxidizing the second columns to form an insulating region underlying the reference membrane.

14. The method of claim 13 wherein the first width of the first column is less than the second width of the second column.

15. The method of claim 13 wherein the step of epitaxially growing the sensor membrane is carried out in a deoxidizing environment.

16. The method of claim 14 wherein the sensor cavity is filled with hydrogen gas.

17. The method of claim 13 further comprising:
   forming a first contact that is in electrical contact with the sensor membrane; and
   forming a second contact that is in electrical contact with the reference membrane.

18. A method of forming a pressure sensor including:
   providing a silicon wafer;
   forming a plurality of sensor trenches in the silicon wafer, each sensor trench being separated from an adjacent sensor trench by a column;
   epitaxially growing a sensor membrane from the columns, the sensor membrane fully covering the sensor trenches; and
   heating the silicon wafer such that the columns migrate toward the sensor membrane and the plurality of sensor trenches merge into a sensor cavity underlying the sensor membrane; and
   forming a piezoresistive element at a periphery of the sensor membrane.

19. The method of claim 18 wherein four piezoresistive elements are formed at the periphery of the sensor membrane.

20. The method of claim 19 further comprising connecting the four piezoresistive elements in a Wheatstone-bridge configuration.

* * * * *

UNITED STATES PATENT AND TRADEMARK OFFICE
CERTIFICATE OF CORRECTION

PATENT NO.        : 8,173,513 B2
APPLICATION NO.   : 12/163110
DATED             : May 8, 2012
INVENTOR(S)       : Flavio Francesco Villa et al.

It is certified that error appears in the above-identified patent and that said Letters Patent is hereby corrected as shown below:

Title page, Item (56):
"5,369,544 A  11/1994 Mastrangelo .... 361/283.4" was omitted from the face of the patent.

Signed and Sealed this
Twenty-sixth Day of June, 2012

David J. Kappos
*Director of the United States Patent and Trademark Office*